(12) United States Patent
Savov

(10) Patent No.: US 8,656,359 B2
(45) Date of Patent: Feb. 18, 2014

(54) DEBUGGING DATA MAPPINGS

(75) Inventor: Boris Savov, Sofia (BG)

(73) Assignee: SAP AG, Walldorf (DE)

( * ) Notice: Subject to any disclaimer, the term of this patent is extended or adjusted under 35 U.S.C. 154(b) by 348 days.

(21) Appl. No.: 13/071,536

(22) Filed: Mar. 25, 2011

(65) Prior Publication Data

US 2012/0246519 A1  Sep. 27, 2012

(51) Int. Cl.
*G06F 9/45* (2006.01)

(52) U.S. Cl.
USPC .......................................................... 717/125

(58) Field of Classification Search
USPC .......................................................... 717/125
See application file for complete search history.

(56) References Cited

U.S. PATENT DOCUMENTS

| 7,669,186 B2 * | 2/2010 | Nolan et al. ................... 717/124 |
| 8,224,997 B2 * | 7/2012 | Strack et al. ................... 709/246 |
| 2007/0006155 A1 * | 1/2007 | Maennel et al. ............... 717/124 |
| 2013/0103705 A1 * | 4/2013 | Thomas ........................ 707/756 |

OTHER PUBLICATIONS

Eclipse; XSLT Project; Dec. 13, 2009; The Eclipse Foundation, Ontario, Canada; (http://wiki.eclipse.org/XSLT_Project).
Stylus Studio; Stylus Studio: Powerful XML Integrated Development Environment (XML IDE); 2011; Progress Software Corporation, Bedford, MA, USA; (http://www.stylusstudio.com/xml_product_index.html).

* cited by examiner

*Primary Examiner* — John Chavis

(57) ABSTRACT

Various embodiments of systems and methods for data mappings with visual debugging capabilities are described herein. A debugger is used to debug data transformations while presenting the actual transformation being debugged. The mapping being debugged is depicted differently than the rest of the mappings. A user can check the current context, continue debugging, resume execution, or terminate the debug session.

18 Claims, 6 Drawing Sheets

DEBUGGING DATA MAPPINGS

FIELD

The field relates to data transformation. More precisely, the field relates to visualization when debugging data mappings.

BACKGROUND

Data mapping is the transformation of data for adaptation to a certain usage. It is often necessary to define comprehensive data transformation mappings between complicated data structures in more than one place. Data mapping is the process of creating transformation between the elements of two distinct data scopes. Defining this transformation takes time and is quite error prone. Sometimes, graphical tools are used in order to show the relationships between data objects by drawing lines representing the connections between fields from different data scopes. Algorithms are used for creating the mapping automatically, based mainly on the idea of connecting the fields from the two scopes that have the same name. This is usually done when handling heterogeneous data, which makes the mapping a complex problem. There are technologies for overcoming this heterogeneous complexity for relational data sources. The structural heterogeneity is a basic mapping problem in order to find effective mappings between distinct data structures. Facilitating and automating data mapping is one of the fundamental challenges for data interoperability.

Data transformations in most cases are quite complex and it is a hard task to find errors during execution of the transformation or the reason why the actual result differs from the expected result. It is even impossible to find the reason of failure for non-mapping domain expert. Typically, a debugger operates with the source code, which defines the data transformation. Such approach requires deep and comprehensive technical and domain knowledge from the person who performs debugging. With visual debugging capabilities, a mapping domain expert will not be required to debug the problems. What happens during the execution of the transformation and what the actual transformation of the source into the target context is will be presented in a simple and clear way.

SUMMARY

Various embodiments of systems and methods for debugging data mappings are described herein. In one embodiment, the method includes defining a data transformation between a source data object and a target data object in a user interface and displaying an initial mapping of elements from the source data object to the target data object. The method also includes toggling a breakpoint on at least one mapping between the source data object and the target data object that requires debugging and displaying the at least one mapping with toggled breakpoint when debugging is in progress. The transformation is confirmed when no further debugging is required.

In other embodiments, the system includes at least one processor for executing program code and memory, a source data object and a target data object, and a mapping module to define a data transformation between the source data object and the target data object and to create an initial mapping of their elements. The system also includes a plurality of predefined mapping rules to be applied for mappings between the source data object and the target data object and a debugging module to debug the mappings between the source data object and the target data object. The system further includes a display for showing the mappings from the source data object to the target data object when debugging the mappings.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for debugging data mappings are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
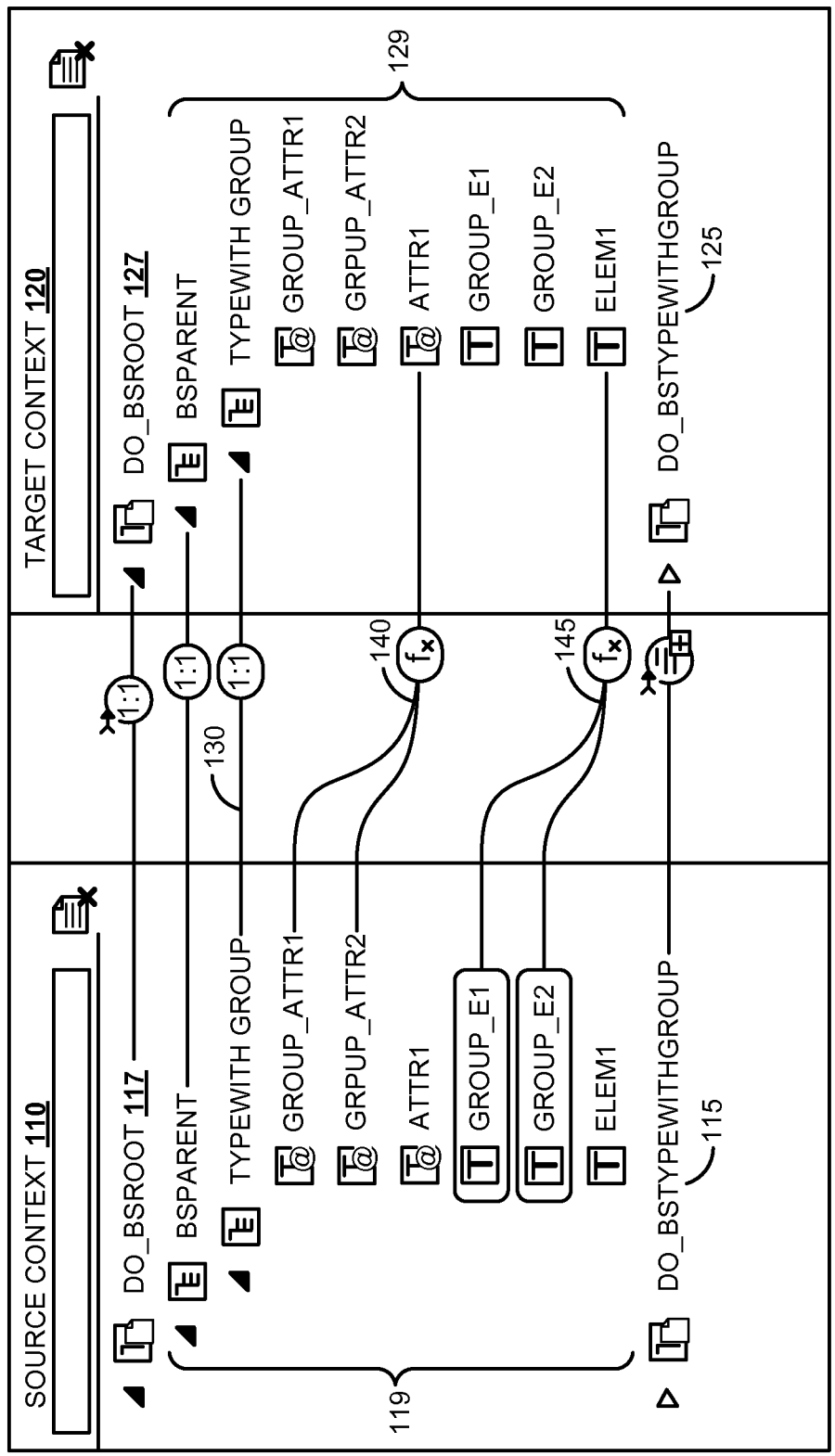
FIG. 1 is a block diagram illustrating data mapping according to one embodiment.

FIG. 1 is a block diagram illustrating data mapping between a source context 110 and a target context 120. The source context 110 consists of source data objects such as 115 and 117 and the target context 120 consists of target data objects such as 125 and 127. Each data object has nodes representing elements of the object. For example data object 117 has nodes 119 and data object 127 has nodes 129. A mapping between elements of a source data object 117 and a target data object 127 may include one-to-one transformation as in mapping 130, or a more complex mapping as in mappings 140 and 145. One-to-one transformation connects single elements between a source and a target data object. In the more complex case, two or more elements are transformed into a single element, which requires special function or a mapping rule. A mapping rule may be predefined and stored in a repository of mapping rules, or an expression editor may be used to define the transformation.

Figure 2:
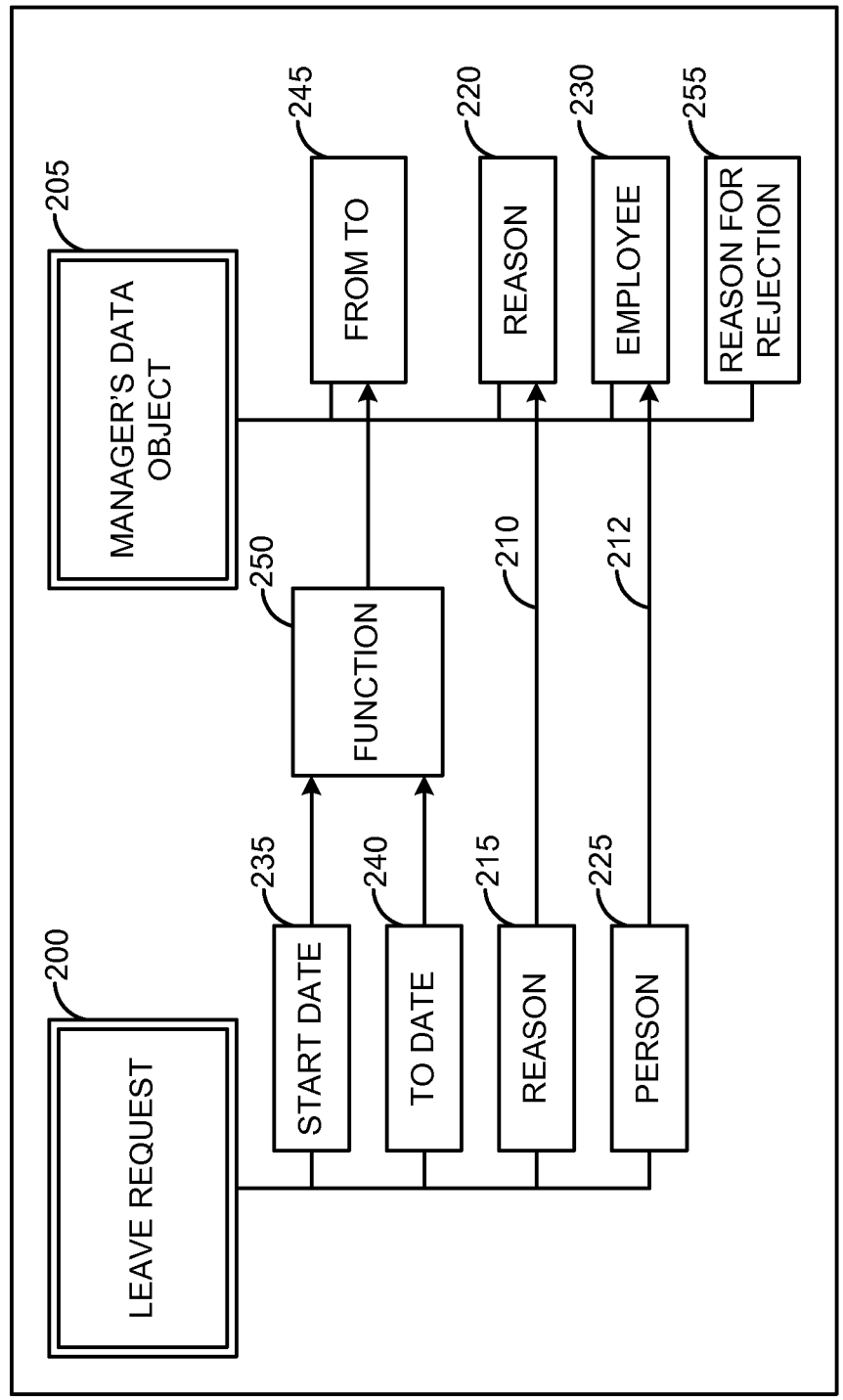
FIG. 2 is an example of a GUI for showing a data transformation using mapping rules.

FIG. 2 is an example of a GUI for displaying a data transformation using mapping rules. Block 200 is a leave request data object and block 205 is a manager's data object. The corresponding fields of the leave request data object 200 and manager's data object 205 are connected via lines 210 and 212. These lines represent the transformation from the leave request data object 200 to the manager's data object 205. In this example, both data structures have hierarchic structures. The initial mapping in this case connects the data that is the same in both the source and the target. For example, <Reason>215 is connected via 210 to <Reason> 220 and <Person> 225 is connected via 212 to <Employee> 230. The <Start date> 235 and <To date> 240 are combined to the <FromTo> 245 field, which requires Function 250 in order to perform the action necessary for the data transformation. This Function 250 may be applied either manually or programmatically. A predefined mapping rule may be used instead of Function 250. The predefined mapping rule defines the relationship between the source data object and the target data object. In the example the mapping rule defines the <Start date> 235 and <To date> 240 as being concatenated to transform the two fields into <FromTo> 245. The node <Reason for rejection> 255 remains unconnected as no transformation is necessary.

Figure 3:
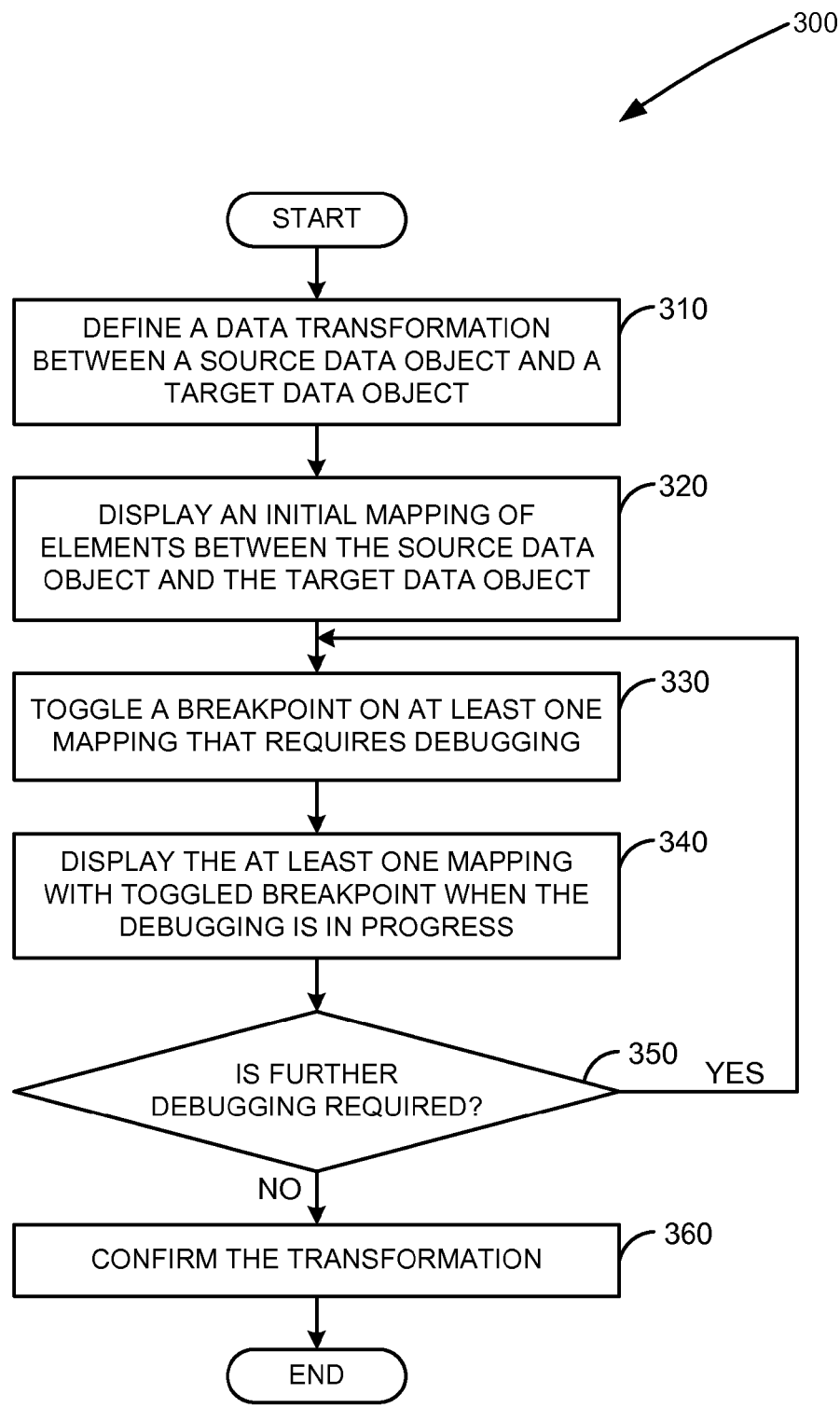
FIG. 3 is a flow diagram of an embodiment of a method for debugging data mappings.
Figure 4:
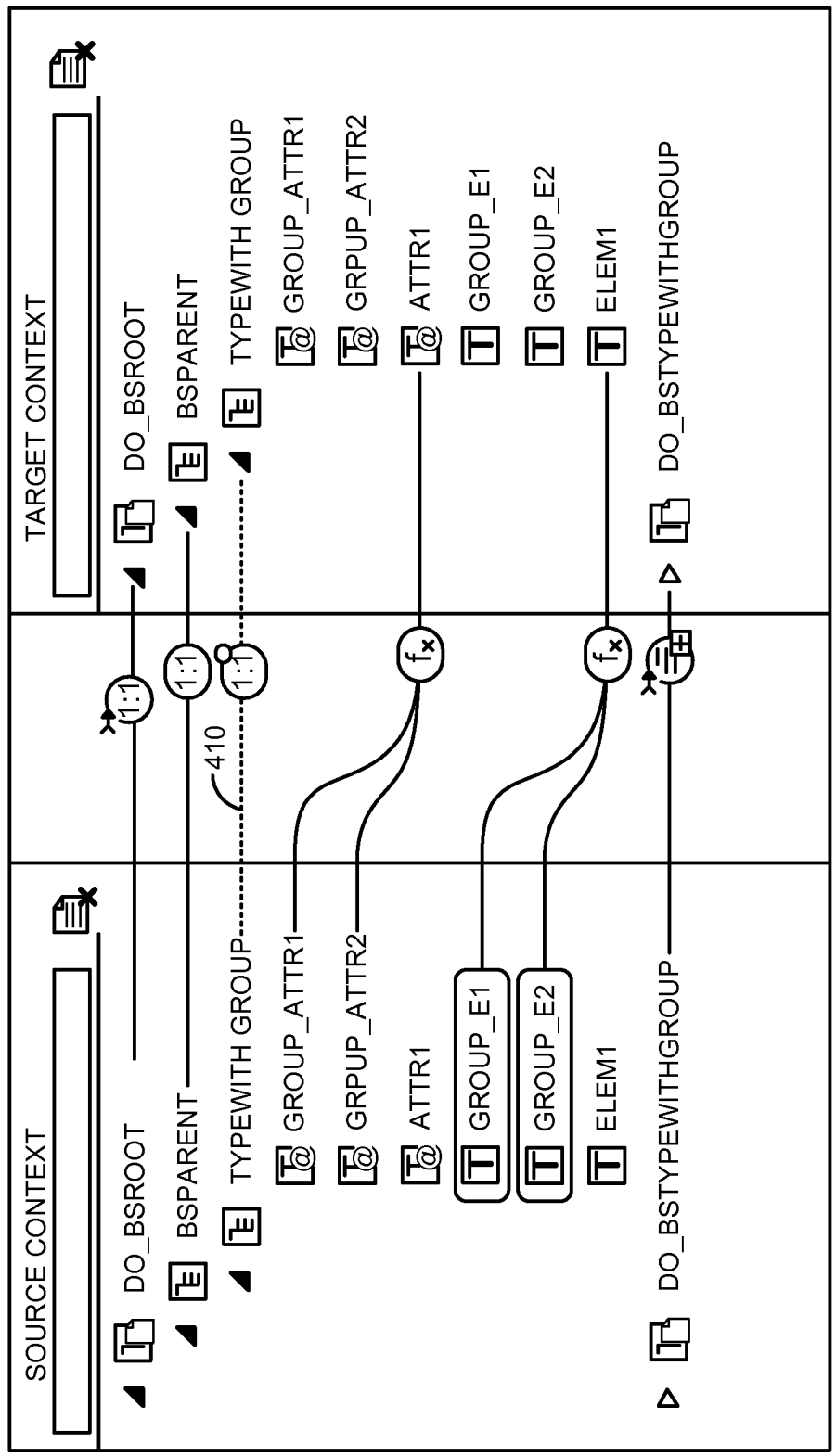
FIG. 4 is a block diagram illustrating debug-suspended data mapping with breakpoint according to one embodiment.

FIG. 3 is a flow diagram 300 of an embodiment of a method for debugging data mappings. The method begins at block 310 with defining a data transformation between a source data object (e.g., 117) and a target data object (e.g., 127). During this definition, information about the data that is going to be mapped is accessed. The accessed information may consist of the elements of the source data object and the target data object and their structure. For example, some data structures are represented as hierarchies in which nodes represent objects and connections between the nodes represent the relationship between the data objects. In one embodiment, a request is received for defining the transformation between the source data object and the target data object. This request may come, for example, through an instruction from a process that operates on the source data object and the target data object. By using a graphical user interface (GUI), such a request may be triggered by simply connecting the source data object to the target data object. The connection can be performed by any pointing input device. At block 320, an initial mapping of elements between the source data object and the target data object is displayed. The information of the elements and their structure is used to create the initial mapping of the elements of the source data object to the target data object. In one embodiment, all the nodes that consist of the same name or type of data will be mapped. For example, if a direct move corresponding of employee name to employee name or employee record to employee record can be accomplished with the initial mapping, this initial mapping of the same name or type of data will be used. The mapping may arise from one or more source data objects. In one embodiment, it is determined that the initial mapping is not suitable for the transformation. The initial mapping may not be suitable if, for example, the type of data is different, despite the same name of the mapped elements. When a mapping is determined as not suitable, then a predefined mapping rule may be used for the mapping between the source data object and the target data object. Predefined mapping rules are common reusable templates for data transformation defined for one or more source data objects to exactly one target data object. A suitable predefined mapping rule may be chosen either manually or automatically from a set of predefined rules. Libraries with mapping rules may be defined for particular cases for reuse. These libraries of mapping rules are applicable for mapping complex to complex, complex to primitive, primitive to complex or primitive to primitive data types. Primitive types are simple and they do not consist of elements. Complex types of data have elements in their content and consist of several primitive types. Each data structure is complex type and a single node is primitive type of data. The predefined mapping rules may be used to specify how to map otherwise incompatible context objects. A need for adjustment may appear when mapping assignment-incompatible types of data. Further, at block 330, a breakpoint is toggled on at least one mapping between the source data object and the target data object that requires debugging. Such breakpoint visualizes mappings that need debugging. Thus, the mappings that need debugging are marked for debugging. In one embodiment the breakpoint is toggled automatically for initial mappings not suitable for the data transformation. In one embodiment, the breakpoint is toggled by clicking the right mouse button over the mapping requiring debugging and choosing a command from a context menu. Then, at block 340, when debugging is in progress, the at least one mapping with toggled breakpoint is displayed. In one embodiment, the mapping with the toggled breakpoint is depicted differently when being debugged. In one embodiment, the mapping with toggled breakpoint is depicted differently as in FIG. 4 by mapping 410. In one embodiment the mapping with toggled breakpoint is presented with a different color than the rest of the mappings. In yet another embodiment, the user is given capabilities to check the current context, continue debugging, resume execution, or terminate the debug session. At decision block 350, a check is performed if there are mappings that require further debugging. If at decision block 350 further debugging is required, than the process returns at block 330 with toggling breakpoints on mappings that require debugging. If at decision block 350 no need for further debugging is determined, then the method continues at block 360 by confirming the transformation between the source data object and the target data object.

Figure 5:
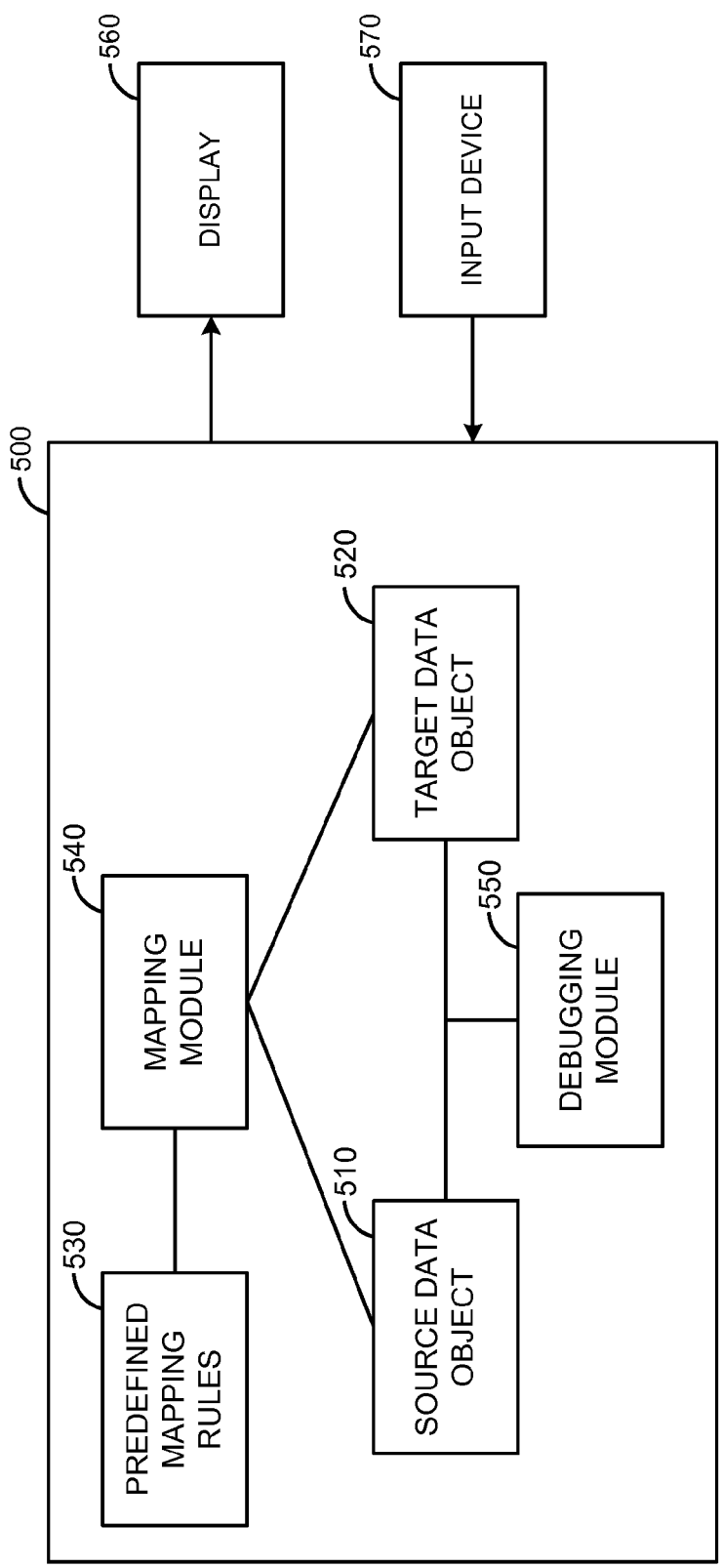
FIG. 5 is a block diagram of an embodiment of a system for debugging data mappings.

FIG. 5 is a block diagram of an embodiment of a system 500 for debugging data mappings. A source data object 510 and a target data object 520 represent data structures to be mapped. A mapping module 540 defines a data transformation between the source data object 510 and the target data object 520 and creates an initial mapping of their elements. The mapping module 540 receives a request for the data transformation between the source data object 510 and the target data object 520. This request may come, for example, from a process that operates on the source data object 510 and the target data object 520. By using a graphical user interface (GUI), such a request may be triggered by simply connecting a source data object 510 to a target data object 520. The connection may, for example, be performed by using any pointing input device such as input device 570.

In one embodiment, the mapping module 540 accesses information about data structures of the source data object and the target data object to be mapped. Based on that, the mapping nodule 540 defines a data transformation between the source data object 510 and the target data object 520 and creates an initial mapping of their elements. The mapping module 540 also determines if the initial mapping needs adjustment. In case the initial mapping created between the source data object 510 and the target data object 520 needs adjustment, mapping module 540 uses predefined mapping rules 530 for a subsequent mapping. Predefined mapping rules 530 are common reusable templates for data transformation defined for a set of sources and target. A suitable predefined mapping rule can be chosen manually or automatically by mapping module 540 from a set of predefined mapping rules 530. In one embodiment, a mapping rule is chosen from predefined mapping rules 530 based on the data structures of the source data object 510 and the target data object 520 to be mapped.

Debugging module 550 is used for debugging the mapping between the source data object 510 and the target data object 520. Debugging may be necessary, for example, when the available predefined mapping rules 530 cannot perform the data transformation from the source data object 510 to the target data object 520. The mapping from the source data object 510 to the target data object 520 is displayed via a GUI on display 560. In one embodiment, a mapping is displayed on the display 560 when being debugged. In yet another embodiment, a mapping is displayed on the display 560 in a distinguishably different manner than the rest of the mappings when being debugged.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
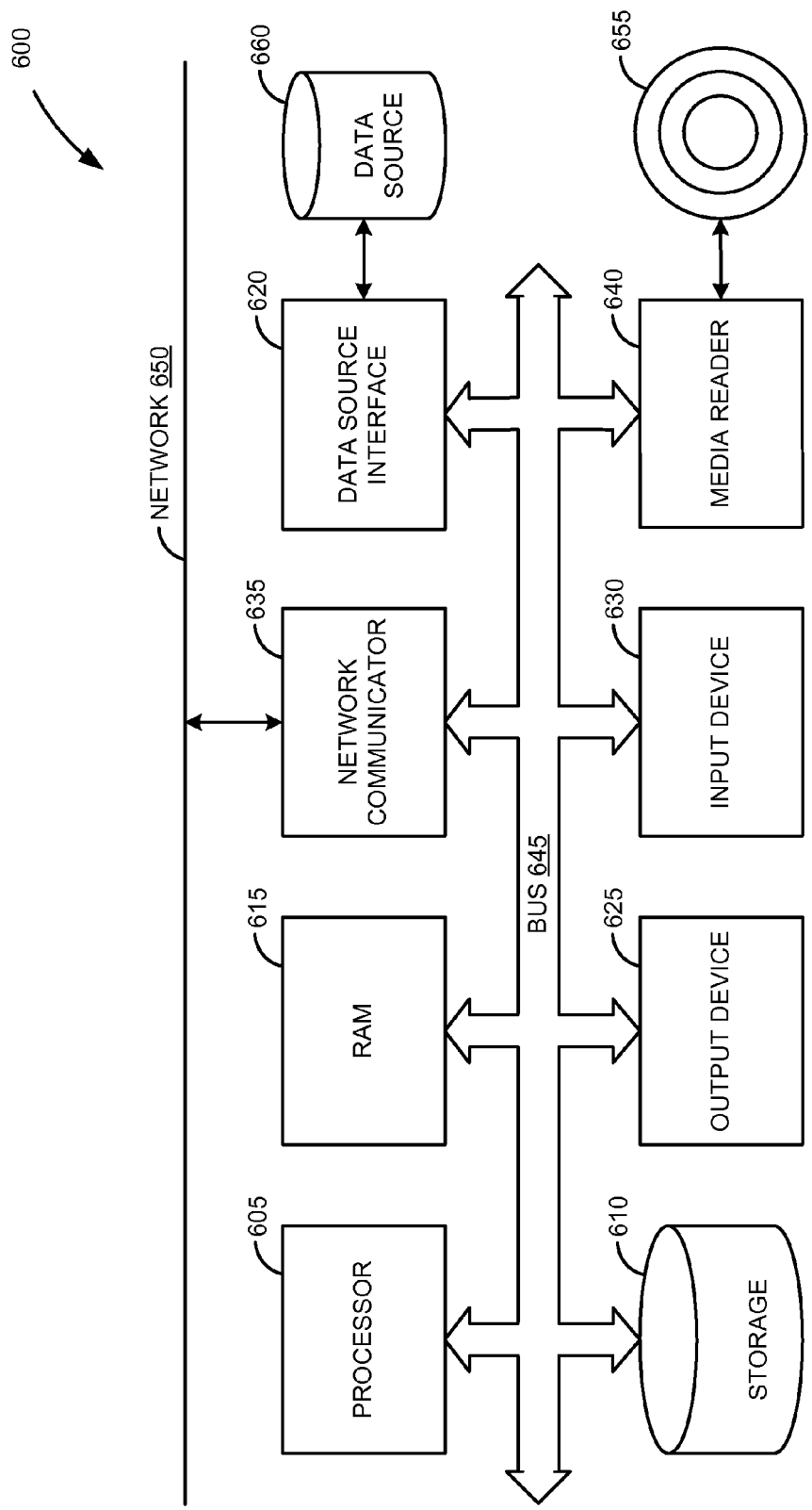
FIG. 6 is a block diagram illustrating a computing environment in which the techniques described for debugging data mappings can be implemented, according to an embodiment of the invention.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for data transformation comprising:
    defining a data transformation between a source data object and a target data object in a user interface;
    based on the data transformation, creating one or more initial mappings between one or more elements of the source data object and the target data object;
    determining at least one mapping from the one or more initial mappings to be adjusted;
    determining one or more predefined mapping rules for adjusting the at least one mapping to at least one subsequent mapping, wherein the one or more predefined mapping rules are reusable templates for an additional data transformation;
    determining a mapping from the at least one subsequent mapping unsuitable for the defined data transformation, wherein the mapping requires debugging;
    toggling a breakpoint for debugging on the mapping between the source data object and the target data object;
    displaying the mapping with toggled breakpoint when debugging is in progress; and
    confirming the transformation when no further debugging is required.

2. The method of claim 1, further comprising receiving a request for the defined data transformation between the source data object and the target data object.

3. The method of claim 1, wherein defining the data transformation further comprises accessing information about data structures of the source data object and the target data object to be mapped.

4. The method of claim 3, wherein the one or more predefined mapping rules are chosen based on the data structures of the source data object and the target data object to be mapped.

5. The method of claim 1, further comprising displaying the one or more initial mappings between the source data object and the target data object in form of lines between the one or more elements of the source data object and the target data object.

6. The method of claim 1, wherein the mapping with the toggled breakpoint is displayed in a distinguishably different manner when being debugged.

7. A computer system including at least one processor for executing program code and memory, the system comprising:
    a source data object and a target data object;
    a mapping module to:
        define a data transformation between the source data object and the target data object and to create one or more initial mappings between one or more elements of the source object and the target object; and
        determine at least one mapping from the one or more initial mappings to be adjusted;
    one or more predefined mapping rules to be applied for adjusting the at least one mapping between the one or more elements of the source data object and the target data object to at least one subsequent mapping, wherein the one or more predefined mapping rules are reusable templates for an additional data transformation;
    a debugging module to:
    determine a mapping from the at least one subsequent mapping unsuitable for the data transformation, wherein the mapping requires debugging;
    toggle a breakpoint for debugging on the mapping;
    debug the mapping with the toggled breakpoint from the one or more subsequent mappings between the source data object and the target data object; and
    a display to show the mapping from the source data object to the target data object when debugging.

8. The system of claim 7, wherein the mapping module receives a request for the defined data transformation between the source data object and the target data object.

9. The system of claim 7, wherein the mapping module accesses information about data structures of the source data object and the target data object to be mapped.

10. The system of claim 7, wherein at least one of the one or more predefined mapping rules is automatically chosen for adjusting the at least one mapping between the source data object and the target data object.

11. The system of claim 10, wherein the at least one of the one or more predefined mapping rules is chosen based on data structures of the source data object and the target data object to be mapped.

12. The system of claim 7, wherein the mapping with the toggled breakpoint is displayed in a distinguishably different manner when being debugged.

13. An article of manufacture including a non-transitory computer readable storage medium to tangibly store instructions, which when executed by a computer, cause the computer to:
    define a data transformation between a source data object and a target data object in a user interface;
    based on the data transformation, create one or more initial mappings between one or more elements of the source data object and the target data object;
    determine one or more predefined mapping rules for adjusting the at least one mapping to at least one subsequent mapping, wherein the one or more predefined mapping rules are reusable templates for an additional data transformation;
    determine a mapping from the at least one subsequent mapping unsuitable for the defined data transformation, wherein the mapping requires debugging;
    toggle a breakpoint for debugging on the mapping between the source data object and the target data object;
    display the at mapping with toggled breakpoint when being debugged; and
    confirm the transformation when no further debugging is required.

14. The article of manufacture of claim 13, further comprising instructions to receive a request for the defined data transformation between the source data object and the target data object.

15. The article of manufacture of claim 13, wherein the instructions to define the transformation further comprise instruction to access information about data structures of the source data object and the target data object to be mapped.

16. The article of manufacture of claim 15, wherein the one or more predefined mapping rules are chosen based on the data structures of the source data object and the target data object to be mapped.

17. The article of manufacture of claim 13, further comprising instructions to display the one or more initial mappings between the source data object and the target data object in form of lines between the one or more elements of the source data object and the target data object.

18. The article of manufacture of claim 13, wherein the mapping with the toggled breakpoint is displayed in a distinguishably different manner when being debugged.

* * * * *